Nov. 26, 1968

E. MASSANO 3,413,577

ABSORPTION WAVEMETER

Filed July 28, 1966

INVENTOR.
ETTORE MASSANO

BY

ATTY.

United States Patent Office 3,413,577
Patented Nov. 26, 1968

3,413,577
ABSORPTION WAVEMETER
Ettore Massano, Milan, Italy, assignor to Automatic Electric Laboratories, Inc., Northlake, Ill., a corporation of Delaware
Filed July 28, 1966, Ser. No. 568,434
1 Claim. (Cl. 333—82)

ABSTRACT OF THE DISCLOSURE

A base wall of an outer conical frustum, the inside surface of a coaxial inner conical frustum with an open base, and a coaxial conductive shaft joining the base wall of the outer frustum and the top wall of the inner frustum, define a first concentric transmission line section. Over the range of frequencies of signal to which the device is to be tuned, this first section, having dimensions much shorter than the wavelengths of the signal, functions as an inductance. A second concentric transmission line section functioning as a capacitive section in series with the first section is formed by adjacent surfaces of the coextensive tapered walls which are closely spaced compared with the wavelengths of the signal. Axial movement of the inner frustum changes the inductance of the first section and the capacitance of the second section simultaneously to effect linear change in resonant frequency over a wide range.

---

Figure 1:
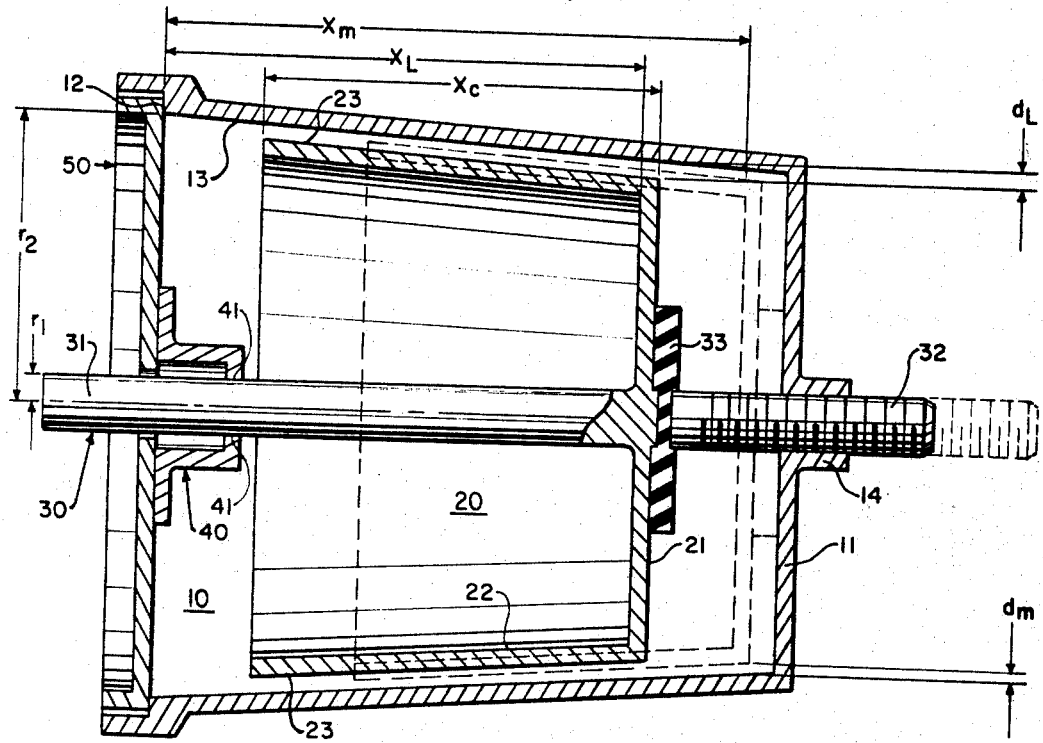

This invention relates in general to frequency measuring apparatus and in particular to an absorption wavemeter for measuring frequencies in the VHF range.

Known absorption wavemeters are either the type which employ circuits with lumped constants or the type which employ concentric transmission line circuits or cavity circuits. Wavemeters which employ circuits having lumped constants have held the advantage of small overall size, while wavemeters employing either concentric transmission line circuits or cavity circuits have held the advantage of a high Q-factor. In the past, absorption wavemeters operating in the frequency range between 50 mh. and 200 mh. have been provided with circuits having lumped constants because, for most applications, the concentric transmission line circuits and cavity circuits have an overall size which is prohibitive.

Therefore, it is the principal object of this invention to provide an improved absorption wavemeter of the concentric transmission line type which has the small overall size advantage of the lumped constants wavemeters and the high Q-factor advantage of the concentric transmission line and cavity wavemeters.

In accordance with a preferred embodiment of the invention, the absorption wavemeter comprises a pair of hollow, concentric, conical frustums and a cylindrical shaft extending concentrically through said frustums. The outer frustum is closed at both ends by flat walls, and the inner frustum is closed by a wall at its smallest base. The inner and outer frustums have the same degree of taper, and the inner frustum is mounted on the shaft which is movable in an axial direction to alter the position of the inner frustum with respect to the outer frustum.

In this preferred embodiment of the invention, the inner surface of the inner frustum, in conjunction with a portion of the inner surface of the outer frustum and a portion of the shaft, form a concentric transmission line section which is short-circuited at two points spaced from each other by the distance between the end wall of the inner frustum and the larger end wall of the outer frustum. The outer surface of the inner frustum forms in conjunction with another portion of the inner surface of the outer frustum a second concentric transmission line section. In accordance with the invention, the lengths of the two concentric transmission line sections are each chosen so as to be small in comparison with the length of a wave at the resonant frequency of the wavemeter so that the first transmission line section acts substantially as a pure inductance, and the second transmission line section acts substantially as a pure capacitance, at the resonant frequency.

It is to be emphasized that while the absorption wavemeter constructed in accordance with this invention employs the concentric transmission line and resonant cavity techniques, it has practically the same size as the conventional lumped constants wavemeter and, therefore has all the advantages of prior art wavemeters of both types without any of the disadvantages of either type. The advantages of the absorption wavemeter constructed according to the invention can be listed as follows:

(1) A very high Q-factor and a resulting sharper definition of resonant frequency;
(2) A practically linear variation within an octave frequency range as a result of the taper of the frustums;
(3) High thermal stability;
(4) High mechanical strength; and
(5) Low manufacturing cost because of the absence, among other things, of inductance coils and variable capacitors with plates having special profiles.

Figure 2:
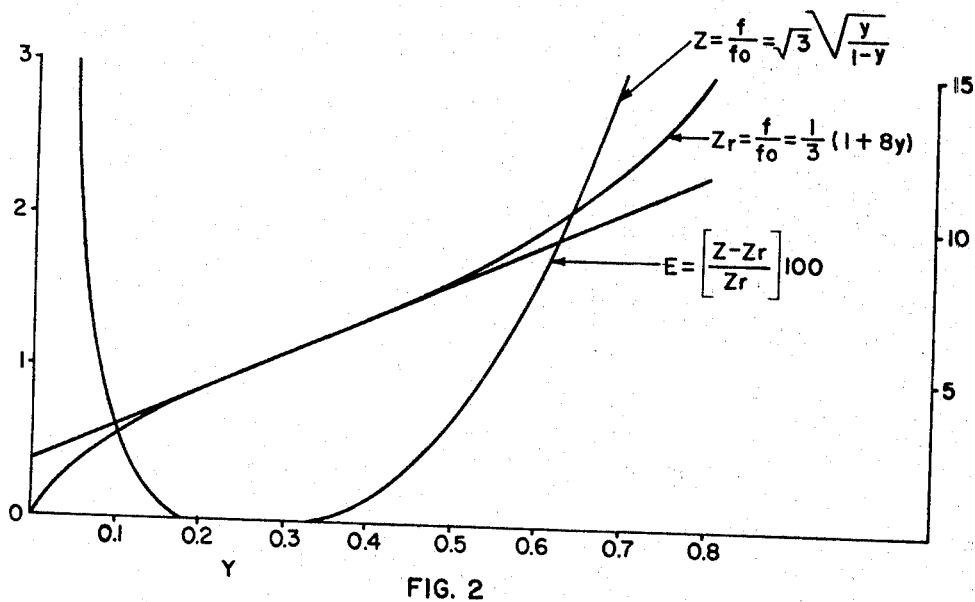

Other objects and features and a complete understanding of this invention will be gained from a consideration of the following description in conjunction with the accompanying drawings, in which:

FIG. 1 is a sectioned elevation view of a wavemeter in accordance with the invention; and FIG. 2 is a graph of the operating characteristics of the wavemeter of FIG. 1.

As shown in FIG. 1, the major elements of the wavemeter, in accordance with the preferred embodiment of the invention, are an outer conical frustum 10, an inner conical frustum 20, and a shaft 30, all of which are concentric. The outer frustum 10 is closed at its smallest base by the flat wall 11 and at its larger base by the flat wall 50, which is mounted on the rim 12 of the frustum 10. The inner frustum 20 is closed at its smaller base by the flat wall 21 and is open at its larger base. The wall 21 is integral with the shaft 30 so that the inner frustum 20 is carried on the shaft 30.

The shaft 30 has a smooth portion 31 journalled in a bushing 40, which is attached to the wall 50. The grippers 41 on the bushing 40 provide the centering for the shaft 30, and they ensure a good electrical path between the outer frustum 10 and the shaft 30. The shaft 30 also has a threaded portion 32 journalled in a threaded bushing 14, which is integral with the wall 11. An insulating disk 33 is interposed on the shaft 30 between the wall 21 and the threaded portion 32.

The inner surface 22 and the outer surface 23 of the inner frustum 20 are parallel to the inner surface 13 of the outer frustum 10. As can be seen, the angle which these surfaces make with the axis of the shaft 30 is very small. By turning the shaft 30 the position of the inner frustum 20 can be changed with respect to the outer frustum. Rotation in one sense causes the inner frustum 10 to move to the right with the result that the distance $d_L$ between the outer surface 23 of the inner frustum 20 and the inner surface 13 of the outer frustum 10 decreases while the distance $X_L$ between the inner surfaces of the walls 21 and 50 increases. Rotation in the opposite sense accomplishes the opposite result.

The electrical operation of the wavemeter will now be described. The inner surface 22 of the inner frustum 20, in conjunction with a portion of the inner surface 13 of the outer frustum 10 and a portion of the surface 31 of the shaft 30, forms a concentric transmission line section having a length $X_L$. This transmission line section is short-circuited on the left side by the wall 50 and on the right side by the wall 21. A second concentric transmission line section of length $X_C$ is formed by the outer surface 23 of the inner frustum 20 and a portion of the inner surface 13 of the outer frustum 10. Input and output coupling of electromagnetic energy may be provided in any of the ways which are well known in the art. For example, the method used may follow the one shown in U.S. Patent 2,572,232, Wolfe, High Frequency Wavemeter, issued Oct. 23, 1951.

According to the invention the lengths $X_L$ and $X_C$ of the first and second transmission line sections are made small in comparison with the length of a wave at a typical resonant frequency of the device. As a result, at a particular resonant frequency the first transmission line section acts substantially as a pure inductance and the second acts substantially as a pure capacitance.

The wavemeter shown in FIG. 1 is tunable over a band of resonant frequencies by changing the position of the inner frustum 20 with respect to the outer frustum 10. When the inner frustum is in the far right position, shown in dashed lines in FIG. 1, the capacitance C due to the second transmission line section is at a maximum because the distance $d_L$ between the surface 23 and the surface 13 is at a minimum value designated as $d_M$. Moreover, the inductance L of the first transmission line section is also at a maximum because the length $X_L$ assumes its maximum value $X_M$.

As the inner frustum 20 moves to the left, the value of $d_L$ increases and the value of $X_L$ decreases. Consequently, the capacitance C and the inductance L decrease simultaneously. As the inductance and capacitance decrease, the value of the resonant frequency increases.

The equation for the resonant frequency $f$ in terms of the inductance L and the capacitance C is the following:

$$f = \frac{1}{2\pi\sqrt{LC}} \quad (1)$$

If the maximum value of the inductance L of the wavemeter is designated $L_M$ and the maximum value of the length $X_L$ of the first transmission line section is designated $X_M$, the expression for the value of the inductance L for any length $X_L$ is as follows:

$$L = \frac{X_L}{X_M} L_M \quad (2)$$

If $d_M$ is the value of the distance $d_L$ between the surfaces 13 and 23 when $X_L$ is at its maximum value $X_M$, the following relationship can be stated $$d_L - d_M = (X_M - X_L)\sin\alpha \quad (3)$$

where $\alpha$ is the angle of the surfaces with respect to the axis.

If the maximum value of the capacitance C is designated as $C_M$, occurring when $d_L = d_M$, the expression for the value of the capacitance C for any distance $d_L$ is as follows:

$$C = \frac{d_M}{d_L} C_M \quad (4)$$

Substituting Equation 3 into Equation 4 gives the result $$C = \left[\frac{d_M}{(X_M - X_L)\sin\alpha + d_M}\right] C_M \quad (5)$$

Finally, if the minimum frequency is designated as $f_m$, occurring when L and C are at their maximum values $L_M$ and $C_M$, respectively, so that $$f_m = \frac{1}{2\pi\sqrt{L_M C_M}} \quad (6)$$

and if the constant $\gamma$ is designated as $$\gamma = \frac{X_M}{d_M}\sin\alpha \quad (7)$$

then the frequency Equation 1 becomes $$f = f_m \sqrt{\frac{(1+\gamma) - \gamma\left(\frac{X_L}{X_M}\right)}{\frac{X_L}{X_M}}} \quad (8)$$

Now, if a linear conversion is made as follows:

$$\frac{X_L}{X_M} = (1-y)\left(1 + \frac{1}{\gamma}\right) \quad (9)$$

the equation in (8) can be further simplified to yield $$\frac{f}{f_m} = \sqrt{\gamma}\sqrt{\frac{y}{1-y}} \quad (10)$$

To check the degree of linearity of the wavemeter the first and second derivatives of Equation 10 must be taken, with the following result:

$$f' = f_m \frac{\sqrt{\gamma}}{2}\sqrt{\frac{1}{y(1-y)^3}} \quad (11)$$

and $$f'' = f_m \frac{\sqrt{\gamma}}{2} \frac{1-4y}{\sqrt{y^3(1-y)^5}} \quad (12)$$

The second derivative becomes zero for $y = 0.25$ so the function $f(y)$ has an inflection at that point.

If $f_0$ is designated as the magnitude of the frequency at the point $y = 0.25$, the following relation is obtained $$\frac{f_0}{f_m} = \sqrt{\frac{\gamma}{3}} \quad (13)$$

When Equation 13 is substituted into Equation 10, the resulting expression in terms of $f_0$ is the following:

$$\frac{f}{f_0} = \sqrt{3}\sqrt{\frac{y}{1-y}} \quad (14)$$

To show the deviations of Equation 13 from a straight line, the tangent at the inflection point ($y = 0.25$) can be considered. Letting $Z = f/f_0$, the equation for the tangent becomes $$Z_r = \frac{1}{3}(1 + 8y) \quad (15)$$

If the relative deviation from a straight line is designated as $\epsilon$, the following relation is obtained:

$$\epsilon = \frac{Z - Z_r}{Z_r} 100 = 1 - \left[\frac{3\sqrt{3}\sqrt{\frac{y}{1-y}}}{1 + 8y}\right] 100 \quad (16)$$

In FIG. 2, the functions $Z(y)$, $Z_r(y)$, and $\epsilon(y)$ have been plotted to illustrate the behavior of the wavemeter.

If the additional contact losses and other losses due to the insulating disk 7 are neglectable (they can be neglected if the wavemeter is carefully constructed), the Q-factor can be calculated by means of the following formula:

$$Q = \frac{\omega L}{R} \quad (17)$$

where L is the inductance and R is the sum of all series-connected resistances in the circuit. To show that a high Q-factor is obtainable with the wavemeter in FIG. 1, a calculation will be made with respect to a particular embodiment in which the material is brass, the operating frequency is 100 mHz, and the wavemeter has the following dimensions: $X_M = 52.5$ mm.; $r_2 = 30$ mm.; $r_1 = 3$ mm. Other constants and formulae required for the calculation are as follows:

DC resistivity:

$$\rho = 6 \times 10^{-8} \text{ ohm/m.}$$

Penetration at 100 mHz.:

$$\delta = \frac{0.123}{f} = 1.23 \times 10^{-5} m$$

Resistance per unit length for a conductor having radius $r$:

$$R_1 = \frac{\rho}{2\pi r \delta}$$

Inductance per unit length:

$$L_1 = 2 \ln \frac{r_2}{r_1} 10^{-7} = \frac{4.6}{10^7} \; h/m$$

The total series resistance R is the sum of the resistance $R_c$ due to the cylindrical portions and the resistance $R_p$ of two flat walls 21 and 50. The equation for the resistance $R_c$, for $X_M = 52.5$ mm. is the following:

$$R_c = \frac{\rho X_M}{2\pi \delta r_1} \left(1 + \frac{r_1}{r_2}\right) \quad (18)$$

Substituting in the values given above, the result becomes $R_c = 15 \times 10^{-3}$ ohms. The equation for the resistance $R_p$ is given by the following:

$$R_p = \frac{2\rho}{2\pi \delta} \ln \frac{r_2}{r_2} \quad (19)$$

Proper substitution results in the $R_p = 3.58 \times 10^{-3}$ ohms.
The total inductance L will obviously be
$$L = (L_1)(X_M) = 2.42 \times 10^{-8}$$
By substituting these results into Equation 18, the Q-factor is calculated as $Q = 825$.

In the preceding calculations the losses due to the second concentric transmission line section have been neglected because they are neglible. Since this line section has a capacitive effect, the following relationship must be used to calculate the Q-factor:

$$Q = \left[\frac{\omega L_1}{R_1}\right]\left[\frac{2 \sin \beta X_c}{2\beta X_c - \sin 2\beta X_c}\right] \quad (20)$$

where $\beta = \omega \sqrt{L_1 C_1}$; and
$C_1 =$ capacity per unit length
$L_1 =$ inductance per unit length
$R_1 =$ resistance per unit length.

Using a series expansion of the term $\sin \beta X_c$ and stopping at the second order term for the denominator and the first order term for the numerator, the Equation 20 becomes $$Q \simeq \left[\frac{\omega L_1}{R_1}\right]\left[\frac{6}{(2\beta X_c)^2}\right] \quad (21)$$

The inductance per unit length for an air gap $d_L = 0.665$ mm. can be calculated as follows:

$$L_1 = 2 \times 10^{-7} \ln \frac{r_2}{r_1} = 4.45 \times 10^{-9} \; h./m.$$

The resistance per unit length is as follows:

$$R_1 = \frac{\rho}{2\delta \pi r_2} = 0.026 \; ohm/m.$$

Finally, for $X_c = 42$ mm., $\beta = 0.088$. Substituting these values into Equation 21 results in $Q = 21,000$. From this it is apparent that the losses due to the second transmission line section are negligible.

Up to this point the wavemeter has been assumed to be made of brass, which has a resistivity of $6 \times 10^{-8}$ ohm/m. If the wavemeter is silver-plated with a sufficient thickness, the resistivity decreases to about $1.8 \times 10^{-8}$ ohm/m., which results in a ratio of 1 to 3.33. However, at the same time the penetration decreases in the ratio of 1 to $\sqrt{3.33}$, or 1 to 1.8. As a result the Q-factor increases in the ratio of 3.33 to 1.8, or about 1.85 times.

The thermal stability of the wavemeter can be determined in the following manner. The frequency at resonance is expressed as follows:

$$f = \frac{1}{2\pi \sqrt{\left[2X_L \ln \frac{r_{2L}}{r_{1L}}\right]\left[X_c \ln \frac{r_{2C}}{r_{1C}}\right]}} \quad (22)$$

where $X_L$, $r_{2L}$, $r_{1L}$ and $X_C$, $r_{2C}$, $r_{1C}$ are the length and radii, respectively, of the first and second line sections. If the material of the wavemeter is homogeneous, the ratios of the radii remain unchanged during expansions due to temperature changes. Thus the only variable terms are the lengths $X_L$ and $X_C$; and since these terms appear in the form of a product under a root, the Equation 22 can be written in the general form $$f = \frac{K}{X} \quad (23)$$

where X is a general length.

If the linear coefficient of expansion is designated as $\alpha$, the relative frequency variation will be expressed by the following:

$$\frac{df}{f} = \frac{-dx}{X} = -\alpha \Delta T \quad (24)$$

where $\Delta T$ is the temperature change.

For the case of brass, $\alpha = 1.7 \times 10^{-5}$; therefore, for a temperature increase of 20° C., there will be a relative change in the resonant frequency of −0.34 per thousand or a decrease in the resonant frequency of 34 kHz. out of 100 mHz.

While the above description has been made with reference to a preferred embodiment of the invention in which the concentric bodies are conical frustums, it is obvious that cylindrical bodies could also be used if the bandwidth requirements are such that capacitive tuning is not needed. Numerous other modifications and changes could be made without departing from the scope of the invention as claimed.

What is claimed is:
1. A concentric transmission line tuning device comprising:
   an outer conductive conical frustum and a smaller inner conductive conical frustum,
   said frustums having the same taper, the inner frustum being coaxially mounted within the outer frustum with the outer surface of the tapered wall of said inner frustum evenly spaced from the inner surface of the tapered wall of said outer frustum,
   said outer frustum having a conductive flat base wall enclosing one end thereof and a smaller conductive flat top wall enclosing its other end, said inner frustum being enclosed by a conductive top wall at its smaller end and being open at its base, the open base of said inner frustum facing said base wall of said outer frustum and said top walls facing each other,
   a conductive bushing centered in said base wall of said outer frustum,
   a conductive shaft extending from the center of the inner face of said top wall of said inner frustum coaxially through said inner frustum and outwardly through said conductive bushing, said bushing permitting sliding movement of said shaft, and said shaft and said bushing providing a low-resistance path between said base wall of said outer frustum and said top wall of said inner frustum,
   means for moving said inner frustum axially within said outer frustum, the height of said inner frustum being substantially less than the height of said outer frustum,
   the inner surface of said inner frustum, said shaft, and the inner surface of said base wall defining a first concentric transmission line section, and the coextensive portions of the adjacent surfaces of said tapered walls defining a second concentric transmission line section in series with said first section, the distance between said tapered walls being short compared with the distance between walls of said first section, the lengths of said sections being small compared with the lengths of the waves over the resonant operating range of said turning device such that said first section is primarily inductive and said second section is primarily capacitive, the conductance of said first section and the capacitance of said second section changing together with axial movement of said inner frustum to provide linear change in the resonant frequency of said device over a wide range.

References Cited

UNITED STATES PATENTS 2,248,227  7/1941  Gantet.
2,435,442  2/1948  Gurewitsch.

ELI LIEBERMAN, *Primary Examiner.*

L. ALLAHUT, *Assistant Examiner.*